United States Patent [19]

Buttrill, Jr.

[11] 4,321,467
[45] Mar. 23, 1982

[54] FLOW DISCHARGE ION SOURCE

[75] Inventor: Sidney E. Buttrill, Jr., Palo Alto, Calif.

[73] Assignee: SRI International, Menlo Park, Calif.

[21] Appl. No.: 156,511

[22] Filed: Jun. 4, 1980

[51] Int. Cl.³ ............................................. B01D 59/44
[52] U.S. Cl. .................................... 250/288; 250/281; 250/423 R
[58] Field of Search ................... 250/423 R, 425, 288, 250/289, 281, 282

[56] References Cited

U.S. PATENT DOCUMENTS

| 3,555,272 | 1/1971 | Munson et al. | 250/288 |
| 3,590,243 | 6/1971 | Perrin | 250/288 |
| 3,944,826 | 3/1976 | Gray | 250/423 |
| 4,122,343 | 10/1978 | Risby et al. | 250/288 |
| 4,239,967 | 12/1980 | Carr et al. | 250/288 |

OTHER PUBLICATIONS

Biospect TM, The Chemical Ionization Mass Spectrometer (Scientific Research Instruments, Baltimore, MD, 1973).

*Primary Examiner*—Bruce C. Anderson
*Attorney, Agent, or Firm*—Urban H. Faubion

[57] ABSTRACT

A flowing discharge ion source for supplying negative and positive ions to a mass spectrometer has an elongated, confined flow and discharge region through which flow the sample to be analyzed and a reagent gas and in which ionizing discharge electrodes are located. Inlet and outlet gas flow orifices are independently variable so that the reagent gas pressure in the discharge region and flow velocity therethrough are controlled. Controlling flow velocity provides one way for determining reagent and sample gas residence time, which is further controlled by making the position of the discharge electrodes adjustable along the length of the ionization region. A controllable heater is provided upstream of the discharge region to regulate reagent and sample gas temperature.

9 Claims, 1 Drawing Figure

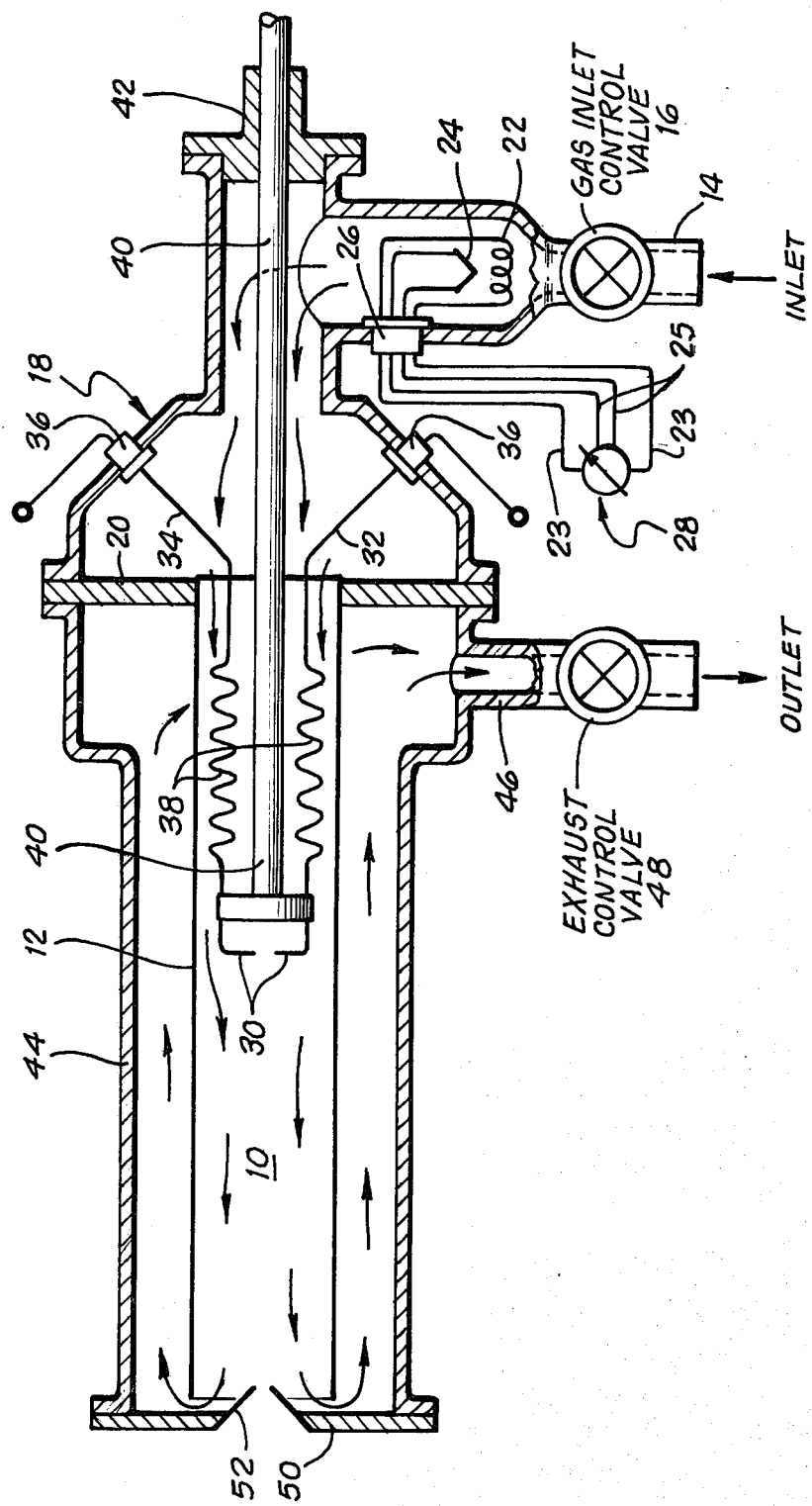

FLOW DISCHARGE ION SOURCE

The Government has rights in this invention pursuant to Grant No. MPS 75-10940, Grant No. CHE 76-20096 and IPA No. 0016 awarded by the National Science Foundation.

BACKGROUND OF INVENTION

This invention relates to a source of ions for mass spectrometers. The mass spectrometer is important as a detector for trace substances which are present in levels of parts per thousand (ppth) or less because of its inherent sensitivity. An unknown material (sample) under investigation is ionized by the source prior to injection into the analyzer, or mass separator section, of the mass spectrometer.

For many applications requiring detection of such low levels of trace elements a direct sampling ion source is particularly attractive. Detection versatility of the instrument is enhanced considerably where all factors which may affect formation of ions from the sample by the source and the efficient extraction of the ions from the source are independently and individually controllable. Such factors include the mode of operation (positive or negative ions), reagent gas pressure and temperature and residence time of the reagent and sample ions.

Accordingly, it is an object of the present invention to provide a practical direct sampling ion source for mass spectrometry.

It is also an object of this invention to provide such an ion source wherein provision is made independently to vary and control all factors which affect the formation of ions from the sample to be analyzed and their efficient extraction from the source.

SUMMARY OF INVENTION

The present invention, a direct sampling ion source, utilizes a confined flow and ionization region through which both the sample to be ionized and a reagent gas are passed and in which an ion forming discharge source is positioned. Gas pressure and gas velocity (hence residence time) in the ion source are controlled by regulating inlet and exhaust pressures, ion residence time is also controlled by varying the position of the ion source along the length of the flow region, and a variable temperature heater is provided at the inlet to the flow region independently to control reagent gas temperature.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawing, in which:

FIG. 1, the single FIGURE, is a partially diagrammatic central vertical section along the full length of the low discharge ion source.

DESCRIPTION OF A PREFERRED EMBODIMENT

A flow discharge ion source, which has been particularly successful and which has the capability of operating with ambient air as the reagent and carrier gas without the need of a separator, is illustrated in FIG. 1. Ionization of sampled gas takes place in a reaction and ionization region 10 inside a reaction and ionization tube 12, which in the embodiment illustrated is stainless steel and has the shape of a right circular cylinder. The arrows in the FIGURE show the general direction of flow of reagent and sample gas in the ionization tube from inlet end (right side of FIGURE) to exit end (left side of FIGURE). As shown, gas samples and reagent gas enter through an inlet tube 14 and variable conductance restrictor or gas inlet control valve 16 (at the right side of the FIGURE). A vacuum tight seal is provided between the ionization tube 12 and inlet tube 14 by an end bell 18 sealed to the inlet tube and a disc shaped flange 20 extending outwardly from the inlet end of the ionization tube 12 to a flange area on the end bell 18. The seal between end bell 18 and ionization tube flange 20 is made in any conventional manner, as by welding. Thus, all gas entering inlet tube 14 is delivered to the ionization tube 12 and is controlled by inlet control valve 16.

In order to control the temperature of the gas entering the ionization region 10, an electrical heater element 22, provided with a thermocouple 24, is located in the stream of gas entering the ionization tube 12. Physically, the heater 22 and temperature regulating thermocouple 24 are located inside the inlet tube 14 just downstream from the gas inlet control valve 16. Power for the heater 22 and thermocouple 24 is provided by way of electrical leads 23 (heater leads) and 25 (thermocouple leads), respectively, which pass through a sealing insulator 26 in the inlet tube wall and are connected to a conventional variable power source 28.

Ionization of the gas in the ionization region 10 in the embodiment shown is provided by a conventional discharge electrode pair 30 which may be operated to inject ions (either positive or electrons) into the gas flow. The power leads 32 and 34 to the discharge electrodes are connected through sealed insulators 36 in the inlet end bell 18 to a power source (not shown). In the instrument illustrated the discharge power source has been operated between 300 and 2900 volts. Reagent and sample ion residence time in the ionization chamber is controlled by providing a way variably to position the location of the discharge electrodes 30 relative to the entry and exit ends of the ionization region 10. Excess lead length of the leads 32 and 34 (shown as pleats 38) for the discharge electrodes 30 allow for movement along the length of the tube 12, and an electrically nonconducting positioning rod 40 connected at one end to the discharge electrodes 30 provides a mechanical link to implement such movement. The positioning rod 40 is movable longitudinally and extends out a vacuum tight seal 42 in the end bell 18. Thus, the discharge electrodes are readily positioned from outside the ion source.

Withdrawal of excess gas and ions is provided by positioning an exit or withdrawal tubular member (tube) 44 concentrically around the outside of the ionization tube 12 in such a manner that it is spaced therefrom. Note that the exit tube 44 is sealed at its back (downstream) end to the end bell 18 and isolated therefrom (from gas flow) by the flange 20 which extends from the ionization tube 12. That is, the flange 20 which supports the ionization tube 12 and seals it to the end bell 18 also forms a seal which prevents mixture of gas from the inlet with the exit gas molecules. An exit tube 46 is connected to the downstream end of the withdrawal tube 44 (near flange 20 in the FIGURE) and at its opposite end to a pump (not shown) with a controlling exhaust valve 48 between. In this manner reagent gas and sample are "pumped" through the ion source and exhaust valve 48 provides additional control.

The source is designed specifically for use with a mass spectrometer. Accordingly, an ion extraction orifice which allows a controlled fraction of the gas and ions from the center of the flow to enter the high vacuum region of the mass spectrometer is provided. The structure which defines the ion extraction orifice includes a disc shaped flange 50 having a centrally located aperture with an inwardly extending conical lip 52 portion. The disc shaped flange 50 is sealed to the end of the withdrawal tube 44 so that the conical lip portion 52 is centered at the exit end of the ionization tube 12 and extends a short way into the ionization region 10. The ion source is inserted into the mass spectrometer with the ion extraction orifice properly positioned relative to the lens and separation system.

Thus it is seen that the objectives of the present invention have been carried out by providing a flow discharge source which operates over a range of source conditions that include those normally associated with both atmospheric pressure ionization and chemical ionization mass spectrometers. Further, operation in positive or negative ion mode is possible, the pressure in the ion source illustrated is variable from less than 1 torr up to 1 atmosphere, the velocity of gas flow through the source is variable over two orders of magnitude, reagent and sample ion residence time is controllable and reagent gas temperature is also variable.

While this particular embodiment of the invention has been shown and described, it will, of course, be understood that the invention is not limited thereto since many modifications, both in the structural arrangement and the instrumentalities employed, may be made. It is contemplated that the appended claims will cover any such modifications as may fall within the true spirit and scope of the invention.

What is claimed is:

1. In a flow discharge ion source for selectively injecting positive and negative ions into the lens system of a mass spectrometer, a reaction and ionization tube defining a region through which reagent and sample gas flows and in which ionization thereof takes place, said reaction and ionization tube having an entry end for receiving the said reagent and sample gas and an exit end for extraction of ions therefrom, an exit withdrawal tubular member surrounding and substantially concentric with the said reaction and ionization tube for removal of excess gas molecules flowing through the said ionization tube, and ionization means within the said ionization tube for selectively generating positive and negative ions, wherein means is provided for independently and selectively controlling reagent gas pressure, reagent gas temperature, reagent and sample ion residence time, and positive and negative ion mode of operation.

2. In a flow discharge ion source for selectively injecting positive and negative ions into the lens system of a mass spectrometer as defined in claim 1, wherein the said withdrawal tubular member is provided with an inwardly extending lip region extending over the said exit end of the said ionization tube, thereby defining an ion extraction orifice for placement adjacent the lens system of a mass spectrometer, and a restricted gas removal region for extracting excess gas and ions from the said exit end of the said ionization tube.

3. In a flow discharge ion source for selectively injecting positive and negative ions into the lens system of a mass spectrometer as defined in claim 1, wherein said means for controlling reagent and sample ion residence time includes means to change the position of the said ion source relative to the said entry end and exit end of the said ionization tube.

4. In a flow discharge ion source for selectively injecting positive and negative ions into the lens system of a mass spectrometer as defined in claim 2, wherein said means for controlling reagent and sample ion residence time includes means to change the position of the said ion source relative to the said entry end and exit end of the said ionization tube.

5. In a flow discharge ion source for selectively injecting positive and negative ions into the lens system of a mass spectrometer as defined in claim 1, wherein the said means for controlling reagent pressure and reagent and sample ion residence time includes means for controlling pressure of gas at the said entry end of the said ionization tube and means for controlling pressure of gas at the said exit end of the said ionization tube.

6. In a flow discharge ion source for selectively injecting positive and negative ions into the lens system of a mass spectrometer as defined in claim 2, wherein the said means for controlling reagent pressure and reagent and sample ion residence time includes means for controlling pressure of gas at the said entry end of the said ionization tube and means for controlling pressure of gas at the said exit end of the said ionization tube.

7. In a flow discharge ion source for selectively injecting positive and negative ions into the lens system of a mass spectrometer as defined in claim 1, wherein the said means for controlling reagent gas temperature includes temperature controllable heater means positioned to heat reagent gas near the said entry end of the said ionization tube.

8. In a flow discharge ion source for selectively injecting positive and negative ions ino the lens system of a mass spectrometer as defined in claim 2, wherein the said means for controlling reagent gas temperature includes controllable heater means positioned to heat reagent gas near the said entry end of the said ionization tube.

9. In a flow discharge ion source for selectively injecting positive and negative ions into the lens system of a mass spectrometer as defined in claim 1, wherein the said means for independently and selectively controlling reagent gas pressure, reagent gas temperature, reagent and sample ion residence time, and positive and negative ion mode of operation includes means to change the position of the said ion source relative to the said entry end and exit end of the said ionization tube, means for controlling pressure of gas at the said entry end of the said ionization tube, means for controlling pressure of gas at the said exit end of the said ionization tube, and temperature controllable heat means positioned to heat reagent gas near the said entry end of the said ionization tube.

* * * * *